Dec. 21, 1937.   J. J. KINAST   2,103,008
COMBINATION TOOL
Filed Dec. 2, 1936
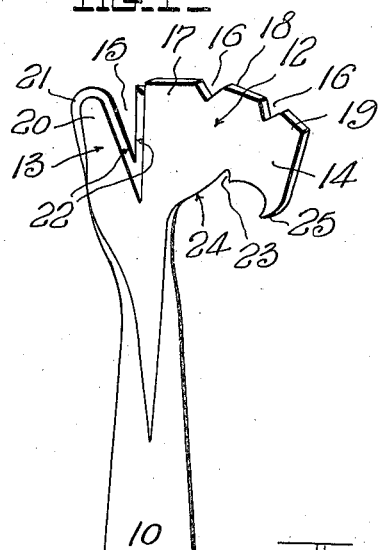
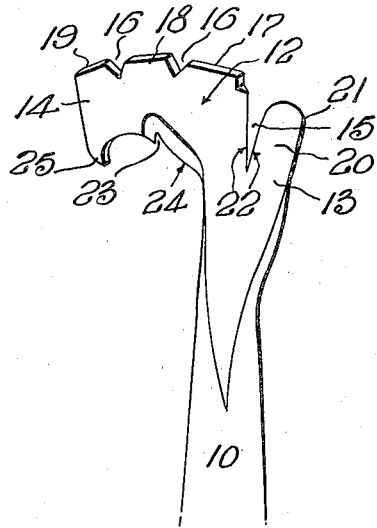
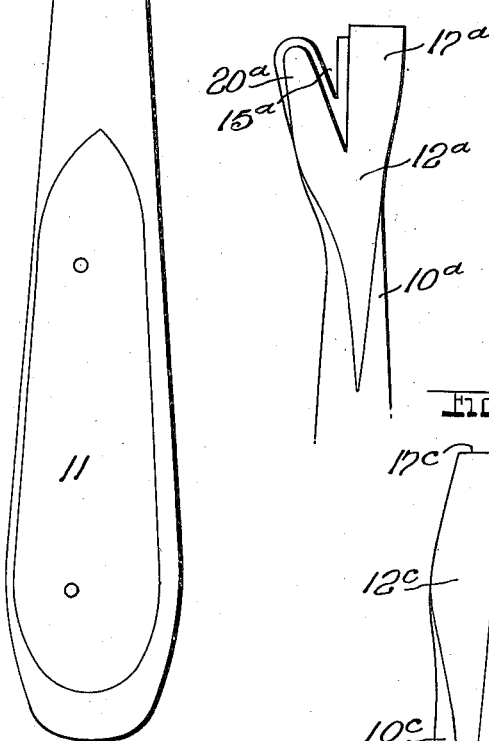
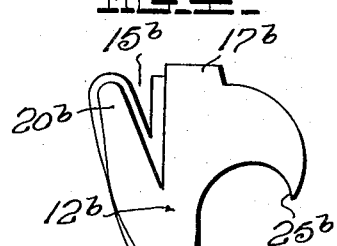
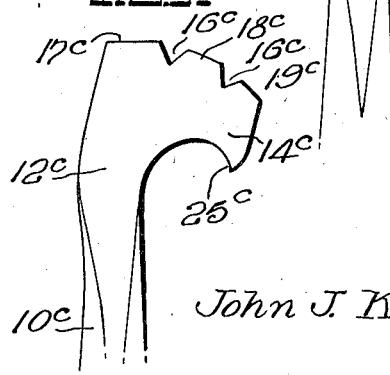
Inventor
John J. Kinast Patented Dec. 21, 1937

2,103,008

UNITED STATES PATENT OFFICE 2,103,008

COMBINATION TOOL

John J. Kinast, Beloit, Wis.

Application December 2, 1936, Serial No. 113,909

1 Claim. (Cl. 254—21)

The object of the present invention is primarily to provide a simple, inexpensive and useful tool capable of performing any of various functions, for instance, tack pulling, cigar box opening, milk can puncturing, syrup can opening, paper carton opening, screw driving or removing, paper slitting, twine cutting, bottle cap removing, removing fish hooks from fishes' mouths, etc. The tool may be made in any desired size, large enough to be used in the carpenter's or plumber's kit, or small enough for use in the home, kitchen, office, school, etc. and constitutes a generally useful instrument.

Figure 1 of the accompanying drawing is a perspective view showing the preferred construction.

Fig. 2 is a perspective view of the same tool looking at the opposite side from that shown in Fig. 1.

Figs. 3, 4, and 5 are side elevations showing modifications.

The tool illustrated in Figs. 1 and 2 will first be described. The shank 10, of suitable metal, is provided at its rear end with a handle or handgrip 11 totally or partially integral with the shank or formed entirely separate therefrom and secured thereto. At its front end, the shank 10 is provided with a thinned, flat, widened head 12 which is elongated transversely of the shank, one end 13 of said head extending laterally to a slight extent from the shank while the other end 14 projects laterally to a relatively great extent from said shank. The front edge of the head 12 is convex and is provided with a V-shaped notch 15 substantially in alinement with the shank 10, and the portion of said edge between said notch 15 and the end 14 of the head, is provided with spaced notches 16 dividing it into screw driver blades 17, 18 and 19, of different sizes. The curvature of the front edge of the head 12 insures that whenever one screw driver blade is being used, the adjacent blade or blades will not drag upon the work.

The portion of the head 12 between the notch 15 and the end 13 of said head constitutes a stubby flat finger 20 having sharpened edges 21 so that it may well be used for various cutting purposes or for opening cigar boxes. The edges of the notch 15 are also preferably sharpened as shown at 22 for twine cutting, it being only necessary to push the tool forwardly against the twine with the latter positioned in said notch to easily cut said twine. The notch 15 is also useable as a puller for tacks and small nails, and the curved front edge of the head 12 constitutes a rocker or fulcrum when the shank 10 is turned about its longitudinal axis after engaging said notch 15 with a tack or the like, allowing rapid removal simply by giving the tool a forward push under the head of the tack or nail and then giving the shank a quick twist.

The head 12 is provided with a rear edge of generally concave form, said edge being preferably provided between its ends with a shallow V-shaped notch 23 and being sharpened at 24 around said notch and between this notch and the shank 10 for cutting twine simply by hooking the same with the tool and pulling rearwardly.

At the juncture of the rear edge of the head 12 with the end 14 of said head, a rearwardly and inwardly curved hook 25 is provided for bottle opening purposes.

In addition to performing the functions explained during description of the construction, it will be obvious that the tool is useable for many other purposes. For example, if it be carried in the fisherman's kit, it will prove of great advantage in removing fish hooks from fishes' mouths, either by pushing the tool with one of the notches 15 or 16 engaged with the hook, or by pulling the tool with the fish hook engaged by the bottle opening hook 25.

In Fig. 3, a construction is shown in which the entire portion of the head 12ª to the right of the screw driver blade 17ª, is omitted, said head being provided only with said screw driver blade, the notch 15ª and the blade 20ª.

In Fig. 4, the head 12ᵇ is similar to that shown in Figs. 1 and 2 but is provided with only one screw driver blade 17ᵇ. A cutting blade 20ᵇ, notch 15ᵇ and bottle opening hook 25ᵇ are shown, corresponding to the blade 20, notch 15 and bottle opening hook 25 of Figs. 1 and 2.

Considering the tools of Figs. 1, 2, and 4 in a different manner, it will be seen that they disclose an improvement in a tack puller of the general type comprising a substantially straight shank having a longitudinal hand-grip at its rear end and two inwardly beveled tack-straddling fingers projecting forwardly from its front end, said improvement consisting of a lateral wing integral with one of said fingers and having a convexedly curved front edge extending from the front end of said one of said fingers, whereby forward pushing of said shank will force said fingers under the head of a tack to loosen the latter, and turning of said shank toward said wing will cause the tool to rock upon said curved front edge of said wing to elevate the loosened tack, it being thus a very easy matter to rapidly follow a row of tacks and remove same.

In Fig. 5, the portion of the head 12c projecting laterally in one direction from the shank 10c, is omitted, the laterally projecting end 14c being provided, however, with the bottle opening hook 25c. The convex front edge of said head 12c is notched at 16c to provide screw driver blades 17c, 18c, and 19c.

Figs. 3, 4, and 5 are illustrative of variations which may be made over the construction illustrated in Figs. 1 and 2, within the scope of the invention. Obviously, the tool is not restricted as to size, materials, etc., and although the flat head is shown integrally connected with the shank 10, being of course appropriately tempered, said head could well be formed from high grade steel and suitably secured to a comparatively cheap and relatively soft metal shank.

As excellent results may be obtained from the details disclosed, they are preferably followed. However, the present disclosure is to be considered as illustrative rather than limiting.

I claim:—

An improvement in a tack puller of the general type comprising a substantially straight shank having a longitudinal hand-grip at its rear end and two inwardly beveled tack-straddling fingers projecting forwardly from its front end; said improvement consisting of a lateral wing integral with one of said fingers and having a convexedly curved front edge extending from the front end of said one of said fingers; whereby forward pushing of said shank will force said fingers under the head of a tack to loosen the latter, and turning of said shank toward said wing will cause the tool to rock upon said curved front edge of said wing to elevate the loosened tack.

JOHN J. KINAST.